(12) United States Patent
Aiki et al.

(10) Patent No.: US 7,339,877 B2
(45) Date of Patent: Mar. 4, 2008

(54) OPTICAL HEAD DEVICE AND INFORMATION PROCESSING APPARATUS

(75) Inventors: Kazuma Aiki, Tokyo (JP); Kenji Sahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 533 days.

(21) Appl. No.: 10/653,856

(22) Filed: Sep. 3, 2003

(65) Prior Publication Data

US 2004/0120243 A1 Jun. 24, 2004

(30) Foreign Application Priority Data

Sep. 4, 2002 (JP) .............................. 2002-258882

(51) Int. Cl.
*G11B 7/135* (2006.01)
(52) U.S. Cl. ................................. 369/112.24
(58) Field of Classification Search ...................... None
See application file for complete search history.

(56) References Cited

U.S. PATENT DOCUMENTS

| | | | | |
|---|---|---|---|---|
| 4,912,311 A * | 3/1990 | Hasegawa et al. | ........... | 235/487 |
| 5,289,313 A * | 2/1994 | Matsuoka | .............. | 369/112.28 |
| 5,586,097 A * | 12/1996 | Nishikawa | ............. | 369/112.24 |
| 5,602,383 A * | 2/1997 | Takekoshi et al. | ..... | 369/112.15 |
| 5,724,335 A * | 3/1998 | Kobayashi | ............. | 369/112.08 |
| 5,734,637 A * | 3/1998 | Ootaki et al. | ........... | 369/112.02 |
| 6,154,434 A * | 11/2000 | Shibano et al. | ........ | 369/112.15 |
| 6,366,542 B1 * | 4/2002 | Kojima et al. | ........... | 369/44.23 |
| 6,635,905 B2 * | 10/2003 | Nido et al. | .................. | 257/103 |
| 6,782,619 B2 * | 8/2004 | Corbett et al. | ................ | 29/858 |
| 6,898,168 B2 * | 5/2005 | Kimura et al. | ......... | 369/112.01 |
| 2004/0120243 A1 | 6/2004 | Aiki et al. | | |
| 2004/0157083 A1 * | 8/2004 | Takahashi et al. | .......... | 428/611 |
| 2005/0098801 A1 * | 5/2005 | Ikeda et al. | .................. | 257/211 |
| 2007/0190677 A1 * | 8/2007 | Okuyama et al. | ............. | 438/22 |

OTHER PUBLICATIONS

U.S. Appl. No. 11/230,473, filed Sep. 21, 2005, Aiki.

* cited by examiner

Primary Examiner—Wayne Young
Assistant Examiner—Parul Gupta
(74) *Attorney, Agent, or Firm*—Oblon, Spivak, McClelland, Maier & Neustadt, P.C.

(57) ABSTRACT

In an optical head device, a light emission source for emitting a plurality of laser beams with different wavelengths and an optical system including an objective lens and a collimator are provided. With respect to the optical system to be used in common for a plurality of optical recording media of different kinds, the RIM intensity is set to be not less than 0.1 and the magnification is set in the range of 4 to 6. With these conditions applied to the RIM intensity and the magnification of the optical system, light utilization efficiency at the time of CD recording is ensured, while preventing this from adversely affecting DVD reproduction or recording and while ensuring a beam spot quality.

3 Claims, 4 Drawing Sheets

OPTICAL HEAD DEVICE AND INFORMATION PROCESSING APPARATUS

BACKGROUND OF THE INVENTION

The present invention relates to an information processing apparatus for recording and reproducing information on a plurality of kinds of optical recording media and an optical head device for use in the apparatus, and particularly to a technology for achieving both an enhancement of the light utilization efficiency of a first optical recording medium and an enhancement of beam spot quality pertaining to a second optical recording medium different in kind from the first optical recording medium in the information processing apparatus or the optical head device.

In a system using an optical recording medium such as compact disk (CD) and digital versatile disk (DVD), an optical head device (or optical pickup device) is used for reading information on the recording medium or recording desired information onto the recording medium.

For example, a two-wavelength type system capable of reproducing or recording information on two kinds of disks by use of two laser beams different in wavelength includes a laser diode (LD) for selective irradiation with two beams different in wavelength, a grating, a polarized beam splitter, a collimator, an objective lens, a holographic optical element (HOE), a photo-detector, or the like.

As for the light emission source composed by use of a laser diode, two LDs different in oscillation wavelength are used, for example in the case of a pickup device for CD recording and an exclusive use for DVD reproduction or in the case of a pickup device for CD recording and DVD recording.

In the case of CD recording (CD-R or the like), the magnification of an optical system including an objective lens and a collimator (the lateral magnification as viewed from the disk side) is ordinarily not more than 4, in view of the need to enhance the light utilization efficiency. On the other hand, in the case of reproduction or recording of information on a DVD, a magnification of not less than 6 is ordinarily used, since a lowering of the magnification broadens the light spot on the disk, possibly leading to degradation of the reproduction or recording performance.

Where an optical system including an objective lens and a collimator and using a two-wavelength type laser diode is used in common for a plurality of kinds of optical recording media, it is difficult with the conventional system to achieve both an enhancement of light utilization efficiency and an enhancement or maintenance of spot quality.

For example, where a system for CD-R recording and DVD recording or reproduction is composed by use of a two-wavelength type laser diode, in order to ensure DVD reproduction or recording performance it is necessary to increase the magnification of the optical system to a certain extent and, hence, to lower the light utilization efficiency pertaining to the CD-R, possibly resulting in that a sufficient recording speed on the CD-R cannot be obtained. On the contrary, in order to ensure a high recording speed by enhancing the light utilization efficiency pertaining to the CD-R, the magnification of the optical system is inevitably small, so that the DVD reproduction or recording performance may be degraded.

Thus, there has been the problem that an increase in the light utilization efficiency for one of the disks results in an adverse effect on the reproduction or recording performance for the other of the disks.

SUMMARY OF THE INVENTION

It is an object of the present invention to ensure that, in an information processing apparatus using a plurality of kinds of optical recording media and an optical head device used in common for a plurality of kinds of optical recording media, the light utilization efficiency for a recordable optical recording medium can be enhanced without thereby degrading conspicuously the reproduction or recording performance as to the other optical recording medium.

In order to attain the above object, in accordance with the present invention, the RIM intensity pertaining to an optical system including an objective lens and a collimator is not less than 0.1, and the magnification of the optical system is in the range of 4 to 6.

Thus, according to the present invention, the magnification of the optical system is set in the range of 4 to 6, whereby a high light utilization efficiency is secured for one of the optical recording media; at the same time, the RIM intensity of the optical system is set to be not less than 0.1, whereby spot quality as to the other of the optical recording media can be enhanced.

In other words, according to the present invention, both an enhancement of recording or reproduction performance by enhancing the light utilization efficiency and an enhancement of reliability by enhancing the spot quality can be achieved simultaneously, in the information processing apparatus using a plurality of kinds of optical recording media.

The above and other objects, features and advantages of the present invention will become apparent from the following description and appended claims, taken in conjunction with the accompanying drawings which show by way of example some preferred embodiments of the invention.

DESCRIPTION OF THE PREFERRED EMBODIMENTS

The information processing apparatus according to the present invention is so constituted that reproduction or recording of information on at least two kinds of optical recording media can be carried out by use of light beams different in wavelength.

Meanwhile, the optical recording media may, for example, be disk-shaped recording media, but the shape (tape, card, etc.) of the media and the recording mode and the like are not particularly limited. In addition, examples of the information processing apparatus (inclusive of recording and/or reproduction system) according to the present invention include configurations capable of CD recording and reproduction and DVD reproduction such as a system including an optical head for CD (CD-R) recording and for exclusive use for DVD reproduction, and configurations capable of CD recording and reproduction and DVD recording and reproduction such as a system including an optical head for CD (CD-R) recording and for DVD recording.

Figure 1:
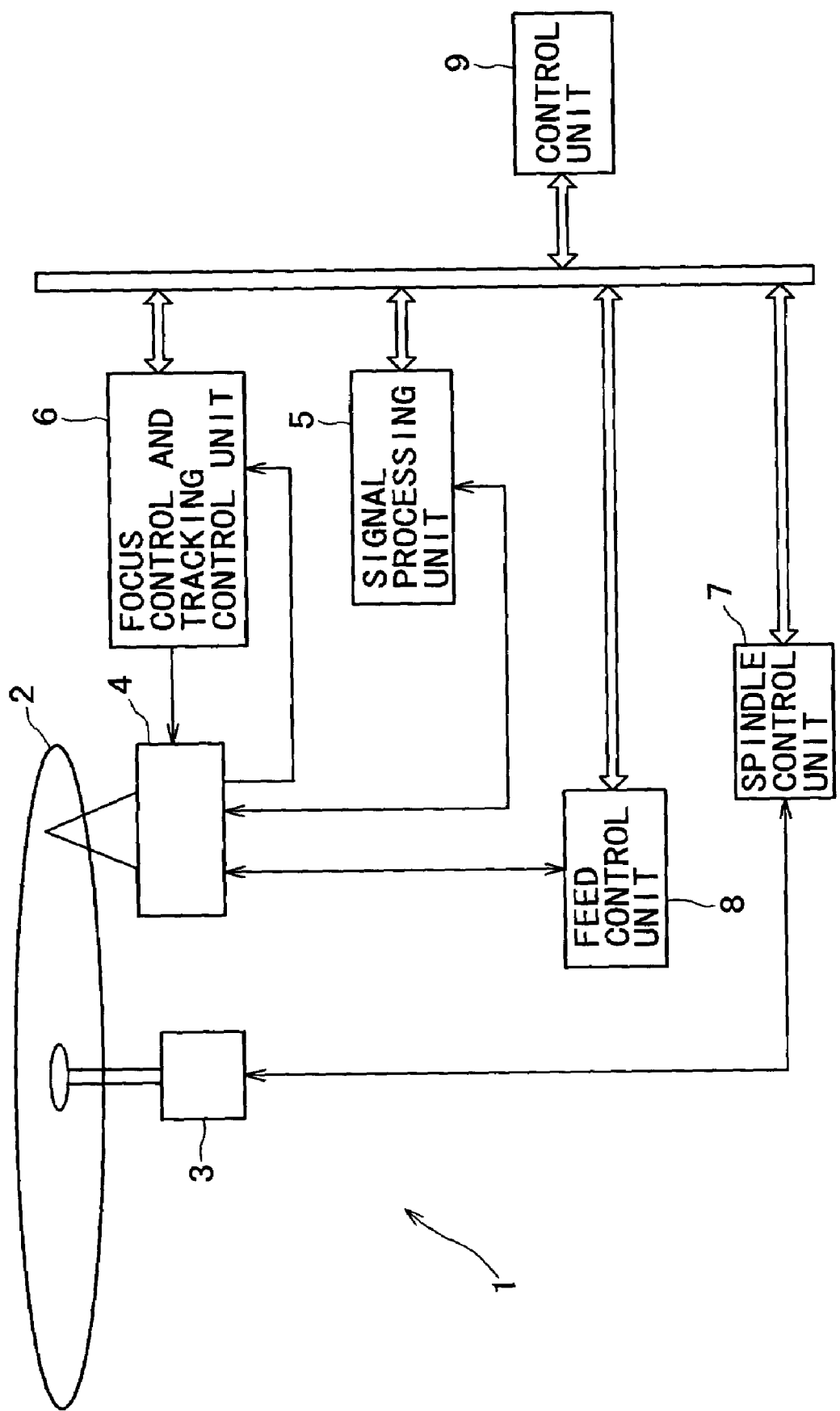
FIG. 1 illustrates an exemplary configuration of an information processing apparatus.

FIG. 1 illustrates simply an embodiment of an information processing apparatus according to the present invention.

The information processing apparatus 1, for example, includes a feeding means (not shown) for feeding an optical recording medium 2, and the optical recording medium 2 is fed to a position for mounting on a turntable by the feeding means. In this embodiment, the optical recording medium 2 is a disk-shaped recording medium, which is rotated by a spindle motor 3.

An optical head device 4 is moved along the radial direction of the disk-shaped recording medium mounted on the turntable, and performs reading or recording of information on the recording medium. The optical head device 4 is provided with an optical system including an objective lens and a collimator for irradiating the optical recording medium 2 with a beam, and a light emitting and receiving means including a light emission source and a light receiving element.

A signal detected by the optical head device 4 is outputted to a signal processing unit 5 and a focus control and tracking control unit 6.

The signal processing unit 5 includes an address decoder for processing a signal from the optical head device 4, and an equalizer, a PLL (phase-locked loop) circuit, a demodulating circuit, etc. relating with a reproduction signal. Besides, a recording signal processing system includes a modulating circuit, a laser driving circuit, etc., and a drive signal and a control signal are sent to a laser light emission source in the optical head device 4.

The focus control and tracking control unit 6 receives a focus error signal and a tracking error signal based on a detection signal from a light receiving means in the optical head device 4, processes the error signals, and controls a drive unit (so-called two-axis actuator) for the objective lens. Namely, at the times of recording and reproduction, a focus control and a tracking control to make a beam spot follow up to a recording track are conducted in response to surface runout of the disk-shaped recording medium, eccentricity of the recording track, or the like.

A spindle control unit 7 constitutes, together with the spindle motor 3, a rotating means for the optical recording medium 2, and functions to control the rotation of the spindle motor 3.

A feed control (slide control) unit 8 is provided for controlling a moving means (a so-called sled mechanism and a drive source therefor) for the optical head device 4, and the optical head device 4 is moved along the radial direction of the disk-shaped recording medium, whereby the visual field position of the objective lens is determined.

A control unit 9 having the function of a control center is constituted by use of a CPU (central processing unit), memories, etc., and is connected to the signal processing unit 5, the focus control and tracking control unit 6, the spindle control unit 7, and the feed control unit 8 via a buss line.

Figure 2:
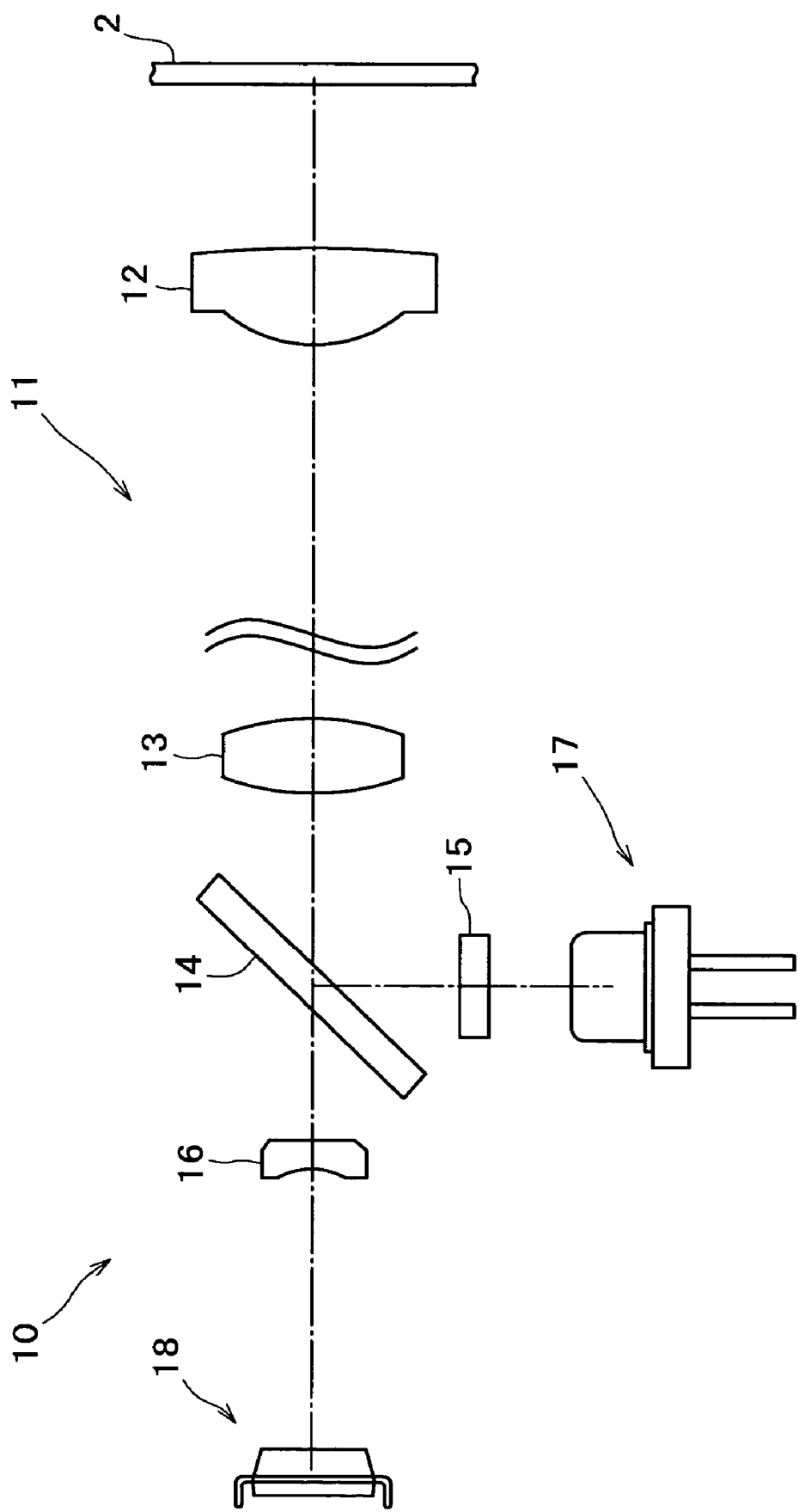
FIG. 2 illustrates an exemplary configuration of an optical head device.

FIG. 2 illustrates generally an embodiment 10 of the optical head device 4.

As shown, the objective lens 12, a collimator (lens) 13, a beam splitter 14, a grating 15, and an adjusting lens 16 are disposed as component parts of the optical system 11 which is configurated as an infinite system.

As a light emission source 17 for emitting laser beams different in wavelength, laser diodes are used. The light emission source 17 is, for example, of the two wavelength type, which can select one of two laser beams different in wavelength. The light emission source 17 is preferably so configured that two light emission points are arranged at a predetermined interval (about 30 to 500 μm). Each of the two laser beams passes through the grating 15, is reflected by the beam splitter 14, and passes through the collimator 13 to be a parallel beam, which passes through the objective lens 12 to irradiate the optical recording medium 2 therewith.

The light receiving means (photodetector) 18 is provided for signal detection (inclusive of not only the detection of a signal representing record information but also the detection of various error signals) with respect to each of the two beams different in wavelength. As the light receiving means 18, for example, a light receiving element including a group of photodiodes is used. The beam returning from the optical recording medium 2 passes through the objective lens 12, the collimator 13, the beam splitter 14, and the adjusting lens 16 to reach the light receiving means 18, where it is subjected to photoelectric conversion. The light receiving means 18 is used for signal detection in common for the two beams different in wavelength.

The optical system including the objective lens 12 and the collimator 13 is used in common for first and second optical recording media of different kinds. Here, examples of the first optical recording medium include a recording medium capable of recording or reproduction of information (DVD or the like), and examples of the second optical recording medium include a recordable recording medium (CD-R or the like).

While an embodiment in which the light emission source and the light receiving means are separate components is shown in FIG. 2, a light emitting and receiving means including a light emission source and a light receiving means may be configurated as an optical integrated device.

Figure 3:
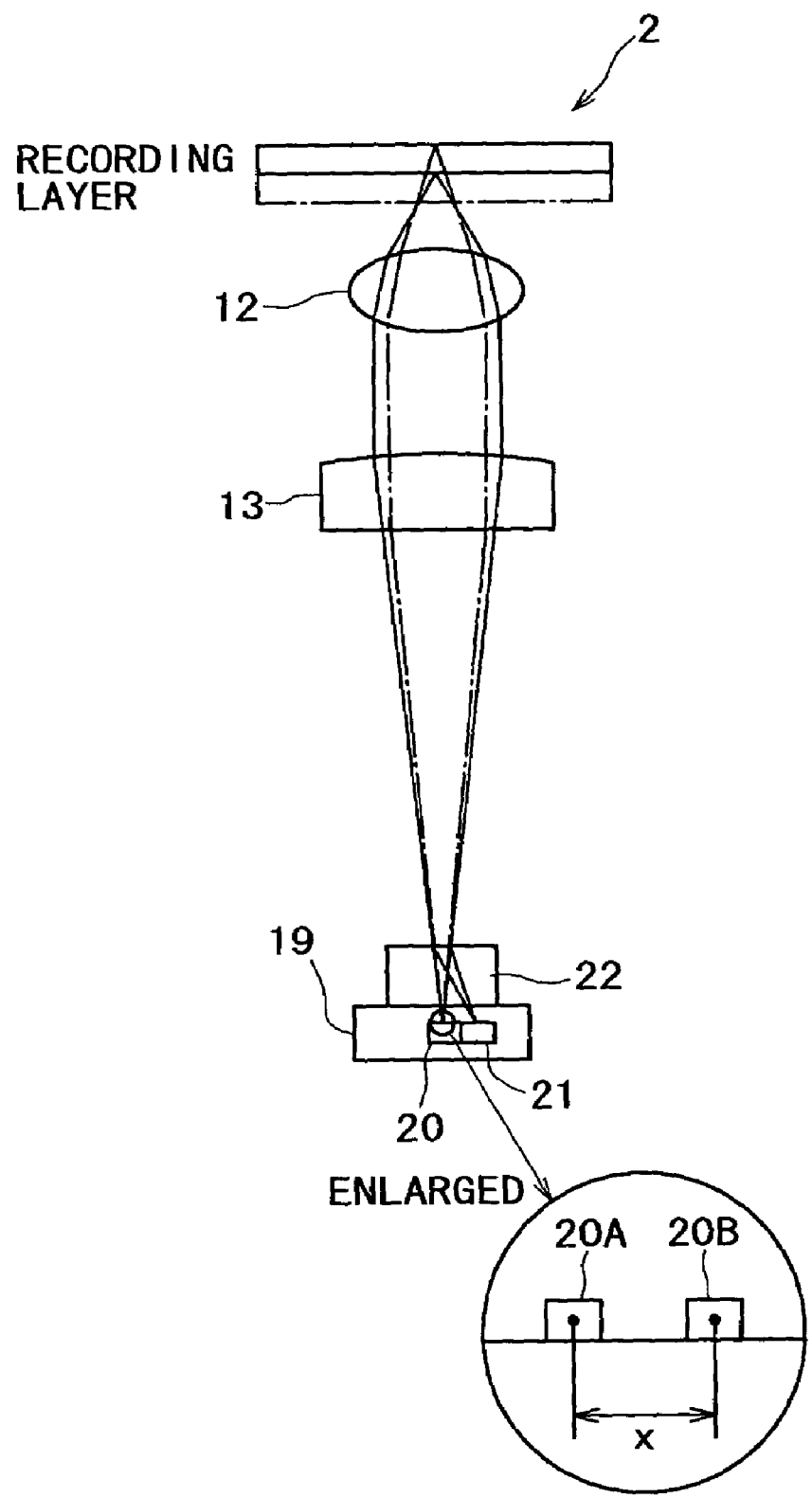
FIG. 3 illustrates another exemplary configuration of the optical head device.

FIG. 3 illustrates the constitution of an optical integrated device as an embodiment of the optical head device.

In this embodiment, the optical head device includes a light emitting and receiving means 19, the collimator 13, and the objective lens 12.

In the light emitting and receiving means 19 of the optical integrated type, a light emission source 20 therein includes two light emitting portions 20A and 20B for emitting light beams different in wavelength are arranged at a predetermined light emission point interval (see "x" shown in the large circular frame in FIG. 3). For example, in the case of a two-wavelength type, two laser diode chips for emitting light beams different in wavelength are incorporated in the optical integrated device, one for DVD (for example, a wavelength of 650 nm) and the other for CD (for example, a wavelength of 780 nm). In addition, a light receiving element 21 for signal detection, which is formed on a substrate, is arranged near the light emission source 20.

The light emitting and receiving means 19 includes a diffraction optical element (holographic optical element or the like) 22; in an optical element made of plastic or glass, a grating is provided on the surface on one side (the surface on the light emission source side), and a split type diffraction element (hologram type diffraction element) is provided on the surface on the other side (the surface on the collimator side).

In this constitution, the light beam emitted from the light emitting and receiving means 19 after being emitted from the light emission source 20 and passing through the grating passes through the collimator 13 to be a parallel light beam, which passes through the objective lens 12 to irradiate the optical recording medium 2 therewith. The light beam returning from the optical recording medium 2 passes through the objective lens 12 and the collimator 13, and is diffracted at a diffraction plane (the surface of the diffraction element) of the diffraction optical element 22, and the diffracted light beam reaches the light receiving element 21.

Figure 4:
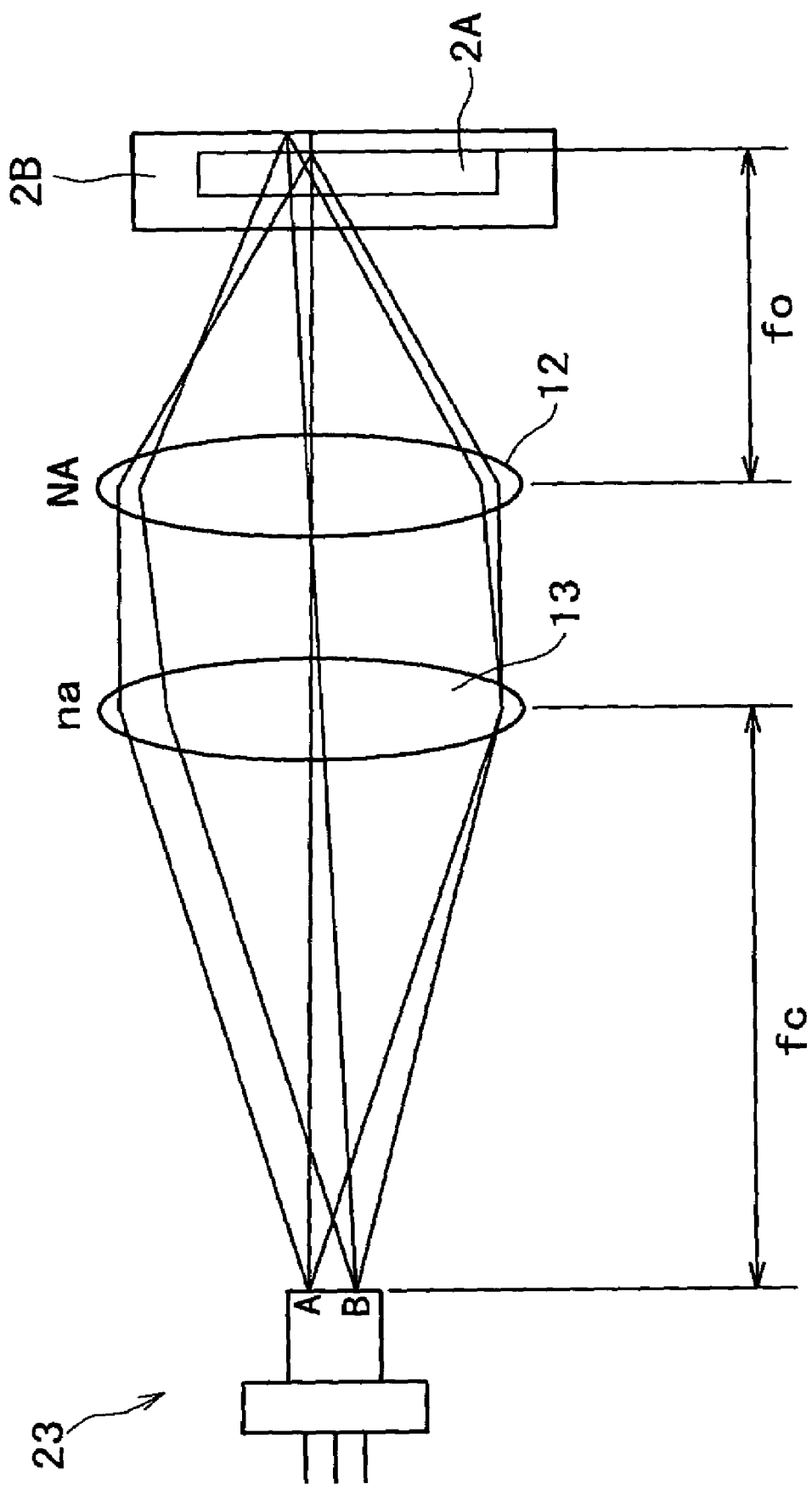
FIG. 4 illustrates an exemplary configuration of an essential part of the optical head device.

FIG. 4 is a conceptual view showing an essential part (exclusive of the light receiving system) of the light emission source and the optical system.

In this embodiment, a two-wavelength type is adopted, in which two laser chips are contained in the same package and which can be used without spoiling the performances of the laser light sources. Therefore, the overall occupying area can be largely reduced, as compared with the case of using two laser light sources as separate elements; besides, omission of the beam splitter promises the merit of reducing the number of component parts.

The laser light beam selectively emitted from the light emission source 23 (see point A and point B in the figure) is condensed onto an optical disk 2A or 2B through the collimator 13 (of which the focal distance is referred to as "fc" and the numerical aperture is referred to as "na") and the objective lens 12 (of which the focal distance is referred to as "fo" and the numerical aperture is referred to as "NA"). In this instance, the magnification (lateral magnification) "M" of the optical system as viewed from the disk side is represented as "M=fc/fo (=NA/na)".

In the case of configurating an optical pickup, for example, for CD (CD-R) recording and for DVD by use of a two-wavelength LD (laser diode) having two light emitting portions (laser chips), it is necessary to use optical systems having the same magnification. In other words, one optical system including an objective lens and a collimator must be used in common for a plurality of kinds of recording media, since the use of separate optical systems for CD recording and for DVD reproduction or recording leads to a complication of configuration or the like problem.

As has been mentioned above, however, CD recording requires a lower M value, whereas DVD requires a higher M value, and it is necessary to design the optical system while taking the two contrary requirements into account sufficiently. Namely, on one hand, the M value of the optical system must be as low as possible for enhancing light utilization efficiency in the case of CD recording, and, on the other hand, the M value must be as high as possible for enhancing spot quality in the case of DVD.

Now, the conditions of the M value and the divergence angles of the light emission sources, for simultaneously attaining both the light utilization efficiency for CD recording and the spot quality for DVD, will be calculated as follows.

First, the RIM intensity (represented by "I") relating to the spot quality is represented by the following Expression 1, by use of the numerical aperture "NA" and the magnification "M" of the objective lens 12 and the divergence angle (full angle at half maximum) "θ" of the light emission source (laser diode).

$$I = \exp\left(-\ln 2 \cdot \left\{\frac{NA}{M \cdot \sin\left(\frac{\theta}{2}\right)}\right\}^2\right) \quad (1)$$

In the above Expression, "exp(X)" represents the exponential function of variable X, "ln(X)" represents the natural logarithm of variable X, and "sin(X)" represents the sine function of variable X.

The RIM intensity is in the relationship of Fourier transformation with the spot shape on the optical disk; when the RIM intensity is lowered, the spot diameter on the disk is enlarged, and crosstalk between the signal on one track and the signals on the adjacent tracks or the like is generated. In other words, the value of the RIM intensity has a lower limit, and the value required for maintaining the spot quality is about 0.1.

The RIM intensity pertaining to the optical system is preferably not less than 0.1 (the upper limit of the RIM intensity is 1), and by putting the condition of "I≧0.1" into the above Expression 1, the condition about θ is obtained by the following Expression 2.

$$\sin\left(\frac{\theta}{2}\right) \geq \sqrt{\left(\frac{\ln 2}{\ln 10}\right) \cdot \left(\frac{NA}{M}\right)^2} = \frac{NA}{M} \cdot \sqrt{\frac{\ln 2}{\ln 10}} \quad (2)$$

The magnification M of the optical system is preferably in the range of "4≦M≦6" on a practical use basis (where M<4, the beam spot on the disk broadens and the reproduction and recording performances are highly possibly deteriorated, and where M>6, the light utilization efficiency may be lowered excessively). Therefore, in the case of DVD, for example, letting the numerical aperture of the objective lens be "NA=0.6" and letting the magnification of the optical system used be M=4 to 5 in the above Expression 2, the lower limit of θ is obtained as 7.5 degrees. Namely, the value of the divergence angle θ (full angle at half maximum) is preferably not less than 7.5 degrees.

$$7.5[\text{degree}] \leq \theta \quad (3)$$

Incidentally, in the case of using laser diodes as the light emission source, the divergence angle has an asymmetry due to the direction of polarization of oscillation. Therefore, the range given by Expression 3 is desirably applied to the divergence angle in the direction parallel to the plane of polarization (this divergence angle is represented by "$\theta_{//}$"). To be more specific, where the divergence angle θ is symmetrical about the optical axis, Expression 3 may be applied directly, but where the divergence angle θ has an asymmetry, the above condition is applied to the divergence angle in a specified direction ($\theta_{//}$ in the direction in which the divergence angle is smaller, as compared with those in the other directions).

Since the RIM intensity does not have an upper limit (ultimately saying, the upper limit is "1"), basically, the upper limit of θ is not determined. However, θ has relationship with the oscillation mode of laser (a near-field pattern of laser), and the divergence angle $\theta_{//}$ in the direction parallel to the plane of polarization has a limit of about 12 degrees, whereas the divergence angle in a direction orthogonal to the plane of polarization (this divergence angle is represented by "$\theta_{\perp}$") has a limit of about 40 degrees.

Therefore, for one of the light beams emitted from the light emission source, the value of the divergence angle $\theta_{//}$ (full angle at half maximum) is preferably in the range of 7.5 to 12 degrees.

Summing up the foregoing, the condition required of the light emission source (laser diodes) for DVD, for example, is the following Expression 4.

$$7.5[\text{degree}] \leq \theta_{//} \leq 12[\text{degree}] \quad (4)$$

Next, the light utilization efficiency (represented by "η") will be described. The light utilization efficiency η is represented by the following Expression 5, by use of the numerical aperture "NA" and the magnification "M" of the objective lens 12, and the divergence angles "$\theta_{//}$" and "$\theta_{\perp}$"

of the light emission source ("$\theta_{//}$" represents the divergence angle in the direction parallel to the plane of polarization, whereas "$\theta_\perp$" represents the divergence angle in the direction orthogonal to the plane of polarization).

$$\eta \propto \left(\frac{NA}{M}\right)^2 \cdot \left(\frac{1}{\theta_{//}}\right) \cdot \left(\frac{1}{\theta_\perp}\right) \quad (5)$$

In the above Expression 5, symbol $\propto$ represents a proportional relationship.

Since aspect ratio (represented by "$\kappa$") is defined as the ratio of $\theta_\perp$ and $\theta_{//}$, namely, "$\kappa = \theta_\perp / \theta_{//}$", Expression 5 can be rewritten by use of this definition, to give the following Expression 6.

$$\eta \propto \left(\frac{NA}{M}\right)^2 \cdot \left(\frac{1}{\kappa \cdot (\theta_{//})^2}\right) \quad (6)$$

Putting the numerical aperture "NA=0.5" and the aspect ratio "$\kappa=2.3$" to be used for CD (CD-R) recording, further calculating the value of $\eta$, namely, the value of "(NA/M)$^2$ · (1/($\kappa \cdot (\theta_{//})^2$))" at the time of "M=3.8" and "$\theta_{//}=8°$", and such a $\theta_{//}$ value that the same condition as that at the time of "M=3.8" and "$\theta_{//}=8°$" is obtained when the magnification M is in the range of 4 to 5 can be obtained as the range given by the following Expression 7.

$$5[\text{degree}] \leq \theta_{//} \leq 8[\text{degree}] \quad (7)$$

Namely, for the other of the light beams emitted from the light emission source, the divergence angle $\theta_{//}$ (full angle at half maximum) is preferably in the range of 5 to 8 degrees.

Since the value of the aspect ratio $\kappa$ is about 1.6 to 2.3, the range of $\theta_\perp$ is determined from the relationship of "$\kappa = \theta_\perp / \theta_{//}$". For example, when $\kappa=2$, $\theta_\perp$ is in the range of 10 to 16 degrees.

On a practical use basis, taking various factors into account based on the above Expression 7, the range given by the following Expression 8 is preferable.

$$10[\text{degree}] \leq \theta_\perp \leq 17[\text{degree}] \quad (8)$$

Summing up the above results, for example, in a system which includes a light source including, arranged side by side, a light emission source with a wide divergence angle such as a laser diode for DVD and a light emission source with a narrow divergence angle such as a laser diode for CD recording and which sufficiently meet the requirements as to the light utilization efficiency necessary for CD recording and the spot quality necessary for DVD reproduction or recording, it is preferable to ensure the following provisions (a) to (c):

(a) To provide a light source (light emission source for DVD) having a divergence angle determined by the above Expression 4 obtained from the consideration of RIM intensity, in relation to spot quality.

(b) To provide a light source (light emission source for CD recording) having a divergence angle determined by the above Expressions 7 and 8, in relation to light utilization coefficient.

(c) To use an optical system including a collimator and an objective lens such that the magnification M is in the range of 4 to 6 (more preferably, in the range of 4 to 5).

By the above provisions, an optical head device to be used in common for both CD recording and DVD reproduction or recording and a disk information processing apparatus using the optical head device can be constituted.

According to the embodiments described above, it is possible to sufficiently ensure DVD reproduction and/or recording performance and to achieve CD recording at high speed.

The present invention is not limited to the details of the above-described preferred embodiments. The scope of the invention is defined by the appended claims and all changes and modifications as fall within the equivalence of the scope of the claims are therefore to be embraced by the invention.

What is claimed is:

1. An optical head device comprising:
    a light emission source configured to emit a plurality of laser beams with different wavelengths;
    a light receiving device configured to detect a signal in said beams with said wavelengths; and
    an optical system including an objective lens and collimator, said optical system being used in common for first and second optical recording media of different kinds, said optical system configured to transmit the laser beams emitted by the light emission source and detected by the light receiving device, wherein
    the RIM intensity pertaining to said optical system is not less than 0.1,
    a first divergence angle (full angle at half maximum) of a first laser beam in the plurality of laser beams to the first optical recording medium at a time of recording or reproducing information is not less than 7.5 degrees,
    a second divergence angle (full angle at half maximum) of a second laser beam in the plurality of laser beams to the second optical recording medium at a time of recording or reproducing information is in the range of 5 to 8 degrees,
    the magnification of said optical system is in the range of 4 to 6, and
    a light emission part of the first laser beam and a light emission part of the second laser beam are arranged with an interval of about 30 to 500 μm.

2. An information processing apparatus for reproducing or recording information on at least two kinds of optical recording media by use of light beams with different wavelengths, said information processing apparatus comprising:
    a light emission source configured to emit a plurality of laser beams with different wavelengths;
    a light receiving device configured to detect a signal in said light beams with said wavelengths; and
    an optical system including an objective lens and a collimator, said optical system being used in common for first and second optical recording media of different kinds, said optical system configured to transmit the laser beams emitted by the light emission source and detected by the light receiving device, the RIM intensity pertaining to said optical system being not less than 0.1,
    a first divergence angle (full angle at half maximum) of a first laser beam in the plurality of laser beams to the first optical recording medium at a time of recording or reproducing information is not less than 7.5 degrees,
    a second divergence angle (full angle at half maximum) of a second laser beam in the plurality of laser beams to the second optical recording medium at a time of recording or reproducing information is in the range of 5 to 8 degrees,
    the magnification of said optical system is in the range of 4 to 6, and a light emission part of the first laser beam and a light emission part of the second laser beam are arranged with an interval of about 30 to 500 µm.

3. An optical head device comprising:

a first light emission source configured to emit a first laser beam at a first wavelength;

a second light emission source configured to emit a second laser beam at a second wavelength different from the first wavelength;

a light receiving device configured to detect a signal in the first laser beam at the first wavelength and in the second laser beam at the second wavelength; and an optical system including an objective lens and a collimator, the optical system being used in common for first and second optical recording media of different kinds, said optical system configured to transmit the laser beams emitted by the light emission source and detected by the light receiving device, a RIM intensity pertaining to the optical system is not less than 0.1, a magnification M of the optical system is represented as M=fo/fc, and the magnification of said optical system is in the range of 4 to 6, wherein fc is a focal distance of the collimator and fo is the focal distance of the objective lens, a divergence angle (full angle at half maximum) of a light beam emitted from the first light emission source toward the first optical recording medium at a time of recording or reproducing information on the first optical recording medium is not less than 7.5 degrees, a divergence angle (full angle at half maximum) of a light beam emitted from the second light emission source toward the second optical recording medium, which is recordable, at the time of recording or reproducing on said second recording medium is in the range of 5 to 8 degrees, and a light emission part of the first light emission source and a light emission part of the second light emission source are arranged with an interval of about 30 to 500 µm.

* * * * *